United States Patent
Maret et al.

(10) Patent No.: US 11,972,913 B2
(45) Date of Patent: Apr. 30, 2024

(54) DISCONNECTOR DEVICE WITH PASSIVE RADIO DEVICE, GRID PROTECTION SYSTEM HAVING THE DISCONNECTOR DEVICE, AND METHOD FOR INDICATING A STATE OF THE DISCONNECTOR DEVICE

(71) Applicant: Hitachi Energy Ltd, Zürich (CH)

(72) Inventors: Yannick Maret, Dättwil (CH); Alexander Fach, Boppelsen (CH); Gian-Luigi Madonna, Otelfingen (CH); Xavier Kornmann, Lauchringen (DE); Stefano Bertoli, Wettingen (CH); Ektor Sotiropoulos, Horgen (CH); Daniel Neeser, Thalwil (CH); Martin Schick-Pauli, Zürich (CH)

(73) Assignee: HITACHI ENERGY LTD, Zürich (CH)

( * ) Notice: Subject to any disclaimer, the term of this patent is extended or adjusted under 35 U.S.C. 154(b) by 300 days.

(21) Appl. No.: 17/602,749

(22) PCT Filed: Apr. 9, 2019

(86) PCT No.: PCT/EP2019/058946
§ 371 (c)(1),
(2) Date: Oct. 9, 2021

(87) PCT Pub. No.: WO2020/207564
PCT Pub. Date: Oct. 15, 2020

(65) Prior Publication Data
US 2022/0165521 A1   May 26, 2022

(51) Int. Cl.
*H01H 31/00* (2006.01)
*H01C 7/10* (2006.01)
(Continued)

(52) U.S. Cl.
CPC ............. *H01H 31/003* (2013.01); *H01C 7/10* (2013.01); *H01H 9/168* (2013.01);
(Continued)

(58) Field of Classification Search
CPC ................. H01H 31/003; H01H 9/168; H01H 2300/032; H01H 9/167; H01H 9/548; H01C 7/10; H02J 13/00022; H02J 2310/44
See application file for complete search history.

(56) References Cited

U.S. PATENT DOCUMENTS

| 9,418,808 B2 * | 8/2016 | Blackwood | H01H 50/54 |
| 2008/0231410 A1 | 9/2008 | Doljack | |
| 2019/0018064 A1 * | 1/2019 | Rostron | H01H 9/168 |

FOREIGN PATENT DOCUMENTS

| EP | 3041013 A1 | 7/2016 |
| WO | 2008092469 A1 | 8/2008 |
| WO | 2017078525 A1 | 5/2017 |

OTHER PUBLICATIONS

International Search Report and Written Opinion of the International Searching Authority, PCT/EP2019/058946, dated Dec. 18, 2019, 13 pages.

* cited by examiner

*Primary Examiner* — Edwin A. Leon
(74) *Attorney, Agent, or Firm* — Sage Patent Group

(57) ABSTRACT

A disconnector device is connectable to pole-mounted equipment in a power grid. The disconnector device is activated in case of an overload condition, thereby disconnecting the pole-mounted equipment. The disconnector device comprises a passive radio device to be enabled via an incoming radio signal. The passive radio device, upon being enabled, transmits, in at least one state of the disconnector device, an indicator radio signal indicative of the respective
(Continued)

state of the disconnector device, the state being one of an activated state and a deactivated state of the disconnector device.

17 Claims, 5 Drawing Sheets

(51) Int. Cl.
*H01H 9/16* (2006.01)
*H02J 13/00* (2006.01)
(52) U.S. Cl.
CPC .. *H02J 13/00022* (2020.01); *H01H 2300/032* (2013.01); *H02J 2310/44* (2020.01)

DISCONNECTOR DEVICE WITH PASSIVE RADIO DEVICE, GRID PROTECTION SYSTEM HAVING THE DISCONNECTOR DEVICE, AND METHOD FOR INDICATING A STATE OF THE DISCONNECTOR DEVICE

CROSS REFERENCE TO RELATED APPLICATIONS

This application is a 35 U.S.C. § 371 national stage application of PCT International Application No. PCT/EP2019/058946 filed on Apr. 9, 2019, the disclosure and content of which is incorporated by reference herein in its entirety.

TECHNICAL FIELD

The present disclosure generally relates to a disconnector device usable on pole-mounted equipment in a power grid.

BACKGROUND OF THE DISCLOSURE

In a power distribution or transmission grid, herein also simply referred to as a power grid, overhead power transmission lines may be mounted on poles, i.e. posts or pylons. Various types of equipment are adapted to be mounted directly to a pole of the power grid. Such pole-mounted equipment may serve the purpose of protecting the power grid or parts thereof, such as in a surge overvoltage protection.

Pole-mounted protection equipment may, for example, be surge arresters, which can be considered as important protection devices in electrical network and protect expensive equipment, such as distribution transformers, against overvoltage surge by locally limiting energy of the overvoltage surge. Preferably, they are installed in group of three on three-phase poles that have a phase-to-ground connection. Another example for pole-mounted equipment are the distribution transformers themselves.

The surge arrester can absorb a limited amount of energy and it may fail after a certain number of protection events and/or a certain overload (e.g. amount and/or duration of an overcurrent). The surge arrester may typically fail by thermal overload which means that the surge arrester may overheat and in extreme cases emit sparks and/or even explode.

To limit such a risk, disconnector devices have been developed, so-called spark prevention units (SPU), whose objective is to disconnect, in a spark-safe way, the surge arrester before a failure occurs. These disconnector devices may reduce the above-mentioned risk by disconnecting the surge arrester before thermal overload. Once disconnected, the surge arrester is removed from the electrical network. There may be a local visual indicator on the SPU that visualizes that the SPU has disconnected (tripped), but visual monitoring may be prone to errors.

When a utility network like a power grid or a power distribution network includes a large number of disconnector devices including SPUs (typically tens to hundreds of thousands), it becomes cumbersome to determine if these are all still connected. Presently, it is required to send out a service crew that visually inspects each and every disconnector device. This is a time intensive task: a given SPU may therefore be inspected only once every year or even less often. A disconnected SPU could thus be in the network for a long period of time. That means that in this location no protection against surge is available, since the surge arrester has been disconnected from the power grid. Analogous considerations also apply for other pole-mounted equipment such as for fuse cutouts that protect distribution transformers against overload.

SUMMARY

It is therefore desirable to address the problem mentioned above, and to provide a technology for making a disconnector device able to be monitored in an easy and reliable manner.

According to an aspect of the present disclosure, a disconnector device is provided. The disconnector device is connectable to pole-mounted equipment in a power distribution or transmission grid. The disconnector device is configured to be activated in case of an overload condition, thereby disconnecting the pole-mounted equipment. The disconnector device comprises at least one passive radio device. The passive radio device is to be enabled via an incoming signal. The passive radio device, upon being enabled, is configured to transmit, in at least one state of the disconnector device, an indicator radio signal. The indicator radio signal is indicative of the respective state or current state of the disconnector device. The state is one of an activated state and a deactivated state of the disconnector device.

According to another aspect, a connection status monitoring device is provided. The connection status monitoring device is configured for monitoring an electrical connection status of a disconnector device as described herein. The connection status monitoring device comprises a determining section. The determining section is configured to perform a contactless detection of the indicator radio signal of the passive radio device. The determining section is further configured to determine, from the detected indicator radio signal, whether the disconnector device is in one of the activated state and deactivated state. The determining section is further configured to generate connection status indicator data indicative of the result of determination.

According to yet another aspect, a use of an assembly in a power distribution or transmission grid is provided, wherein the assembly comprises a disconnector device as disclosed herein. The disconnector device is connectable to pole-mounted equipment in the power distribution or transmission grid. The assembly comprises the connection status monitoring device as disclosed herein.

According to yet another aspect, a grid protection system is provided. The grid protection system comprises pole-mounted equipment that is connected to a power distribution or transmission grid. The grid protection system further comprises a disconnector device as disclosed herein, wherein the disconnector device is connected to the pole-mounted equipment. The grid protection system further comprises a connection status monitoring device as disclosed herein.

According to yet another aspect, a method for indicating a state of a disconnector device is provided. The disconnector device is connectable to pole-mounted equipment in a power distribution or transmission grid. The disconnector device is further configured to be activated in case of an overload condition, thereby disconnecting the pole-mounted equipment. The disconnector device comprises at least one passive radio device to be enabled via an incoming radio signal, and the state being one of an activated state and a deactivated state of the disconnector device. The method comprises enabling the passive radio device; and when the disconnector device is in at least one of the states, transmitting, via the passive radio device, an indicator signal indicative of the respective state of the disconnector device.

BRIEF DESCRIPTION OF THE DRAWINGS

Embodiments of the present disclosure will be presented in the sense of examples and their advantages are explained in greater detail below, with reference to the accompanying drawings, wherein.

DESCRIPTION OF EMBODIMENTS

Figure 1:
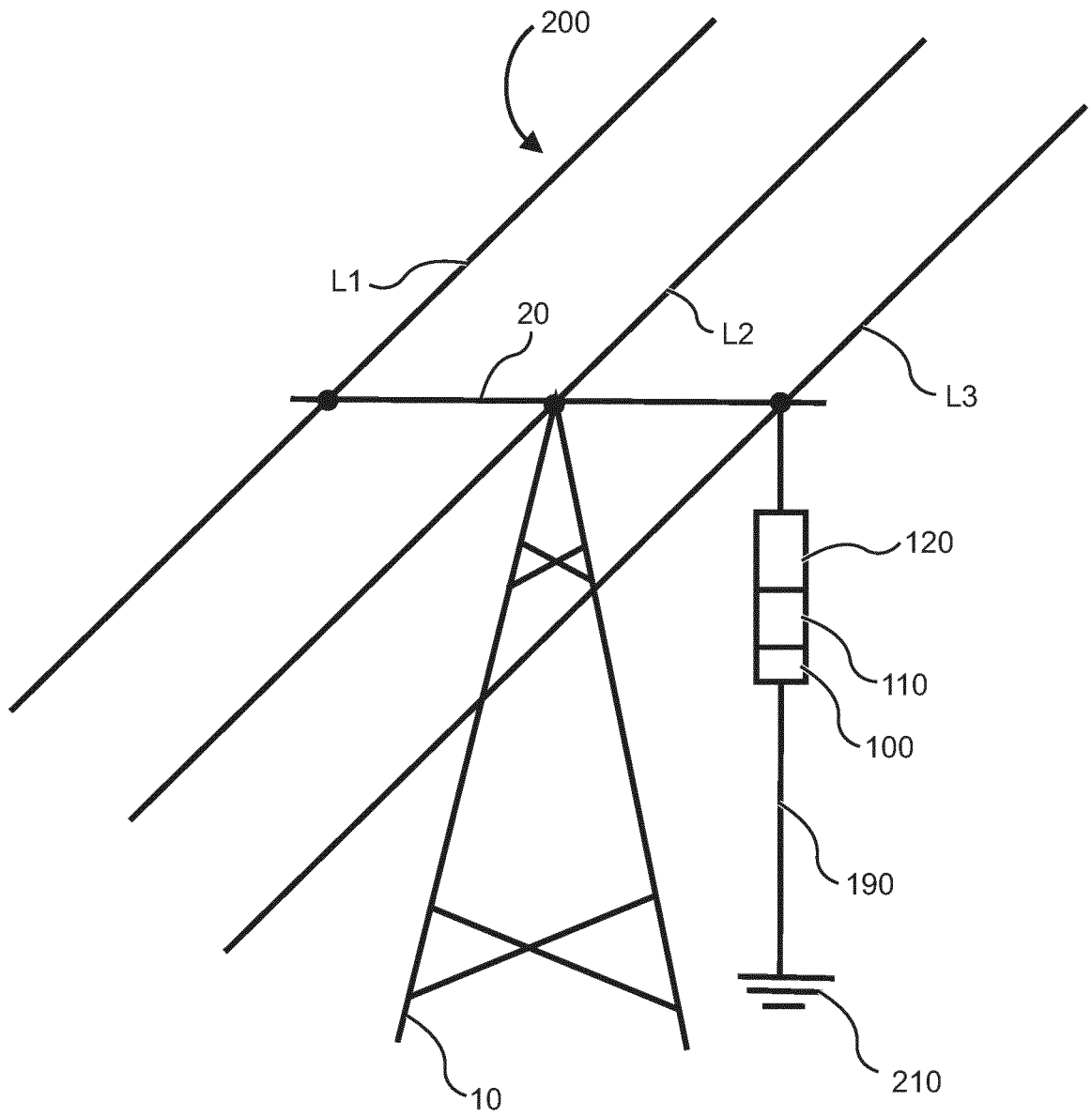
FIG. 1 schematically shows a section of a power grid with a disconnector device according to embodiments.

The disclosed subject-matter will now be described with reference to the drawings. Various structures, systems and devices are schematically depicted in the drawings for purposes of explanation only and so as to not obscure the description with details that are well known to those skilled in the art. The attached drawings are included to describe and explain illustrative examples of the disclosed subject-matter.

FIG. 1 schematically shows a section of a power grid 200 according to an embodiment. For reasons of simplicity, details like insulators are not shown in the drawings. In FIG. 1, lines L1 to L3 correspond to AC phases of overhead power lines of the power grid. However, the configuration described herein is not limited to AC applications, and may as well be used in an HVDC overhead line configuration, for example. Lines L1 to L3 are typically mounted on insulators (not shown), for example insulators suspended from a traverse section 20 of a pylon or pole 10.

Exemplarily, pole-mounted equipment 120 such as a surge arrester and a disconnector device 110 or spark prevention unit are connected in series between a line (here L3) of the power grid via ground cable 190 to ground 210. The pole-mounted equipment may have a first and a second terminal, wherein the first terminal is electrically connectible to the respective line of the power grid. The disconnector device 110 may have a third and a fourth terminal, wherein the third terminal may be electrically connected to the second terminal of the pole-mounted equipment 120, and the fourth terminal may be electrically connected, via the grounding cable 190, to ground 210.

Herein, pole-mounted equipment is equipment that is adapted to be mounted, directly or indirectly, to the pole 10 of the power grid, and that is to be mounted to the pole 10 during operation Pole-mounted, as used herein, includes for example also parts of the carrying structure of the pole, such as the traverse section 20, and/or parts mounted thereon or suspended therefrom. Preferably, the pole-mounted equipment is adapted to be connected to a line of the grid. In particular aspects of the disclosed subject matter, the term "pole-mounted equipment" may be replaced by at least one of a surge arrester, a power transformer, and a fuse cutout.

In case of an overvoltage surge caused by, e.g., a lightning strike, the surge arrester 120 establishes a connection to ground 210 and thereby allows energy of the overvoltage to dissipate to ground, thus limiting effects of the overvoltage surge. However, as mentioned above, the power to be dissipated by the surge arrester 120 may exceed its rated power or maximum power, such that the surge arrester 120 enters an overload condition. In order to avoid such an overload, the disconnector device 110 will, in case of an overload condition, interrupt the connection between the connected line (here L3) of the grid and ground 210. This interruption is also referred to as an activation of the disconnector device 110. Thereby, the current flow through the surge arrester is interrupted. Similarly, the disconnector device 110 may also allow avoiding an overload of other pole-mounted equipment than a surge arrester 120. The power distribution or transmission grid and/or the pole-mounted equipment 120 may be rated for high voltage. A high voltage, for example, may refer to a voltage (effective value) of at least 1 kV, typically at least 10 kV. In case of a distribution transformer, the rated voltage refers to the higher-voltage side of the transformer.

Furthermore, at least one passive radio device 100 is assigned to the disconnector device 110. Typically, the at least one passive radio device 100 is attached to or mounted on the disconnector device 110.

The radio device being a passive radio device, as used herein, is understood such that it does not have or does not need a local power supply, such as a wired power supply, in order to perform the transmission. For example, an RFID radio device is considered passive in this sense, since it can be constructed and operated such that it transmits information upon having harvested energy from an external field, such as an external magnetic or external electromagnetic field, and by modulating the energy thereof. An RFID radio device is considered passive also in the case that it has an auxiliary internal power supply for processing, but does not involve energy therefrom to initiate the transmitting operation. Energy for waking up the passive radio device and subsequently start the processing and the transmission of information, such as for transmission of the indicator radio signal, is provided from outside of the passive radio device 100.

A passive radio device equipped with e.g. an auxiliary power source such as a battery only uses the auxiliary power source once it has been enabled, or "waked up", via the incoming activation signal.

Each passive radio device 100 is enabled via an incoming radio signal 310, which is further elaborated below with reference to FIGS. 2 and 3.

The passive radio device 100 being enabled via the incoming radio signal, as used herein, may involve that the passive radio device 100 is put into a transmission mode via the incoming radio signal. A transmission mode may include a mode in which the passive radio device 100 is able to transmit information, such as the indicator radio signal.

Upon being enabled, the passive radio device 100 is configured to transmit, in at least one state of the disconnector device 110, an indicator radio signal. Upon being enabled, as used herein, may include that enabling the passive radio device 100 goes along with an activation thereof.

Transmitting, as used herein, refers to influencing a field or wave such as a magnetic field or an electromagnetic field such that it carries an information. The field may be produced internally, i.e. by the passive radio device itself. Alternatively, the field may be produced externally, i.e. by a device external to the passive radio device and located 50 cm or more from the passive radio device.

For example, the passive radio device may be or may comprise a passive radio transponder. A passive radio transponder typically is a device that, upon receiving a signal such as an activation signal, emits a different signal or alters the received signal, in response. The indicator radio signal transmitted by the passive radio device 100 is indicative of the state of the disconnector device 110. The state is one of an activated state and a deactivated state of the disconnector device 110.

For example, the at least one passive radio device 100 may be configured to transmit the indicator radio signal only in the case that the disconnector device 110 is in the activated state. This example may include the variant in which the at least one passive radio device 100 can only be enabled when the disconnector device 110 activated state, and cannot be enabled when the disconnector device 110 is in the deactivated state.

In another example, the at least one passive radio device 100 may be configured to transmit the indicator radio signal only in the case that the disconnector device 110 is in the deactivated state. This example may include the variant in which the at least one passive radio device 100 can only be enabled when the disconnector device 110 deactivated state, and cannot be enabled when the disconnector device 110 is in the activated state.

In yet another example, the at least one passive radio device 100 may be configured to transmit one kind of indicator radio signal in the case the disconnector device 110 is in the activated state, and it is configured to transmit another kind of indicator radio signal in the case that the disconnector device 110 is in the deactivated state.

Figure 2:
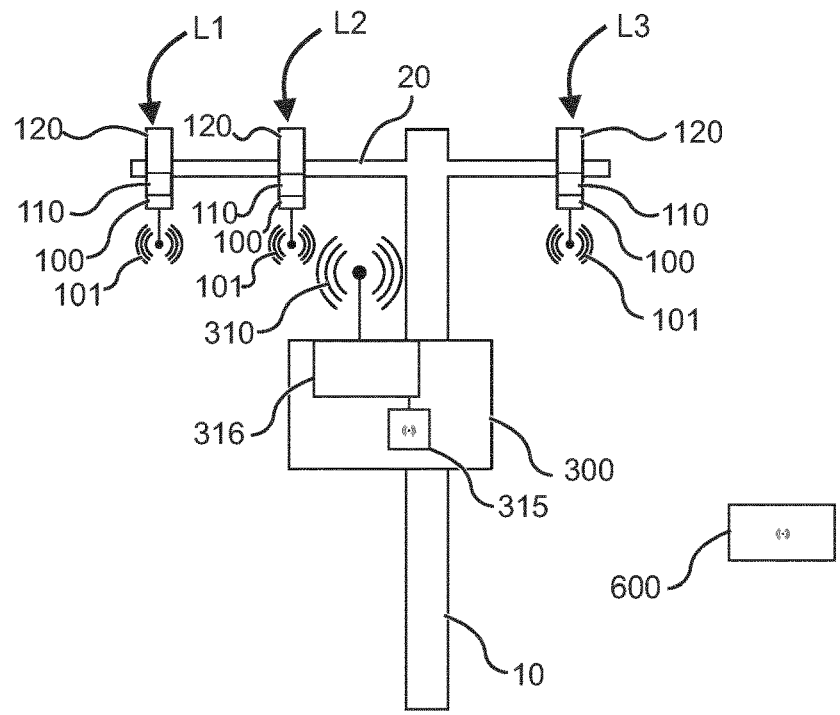
FIG. 2 schematically shows an exemplary configuration of plural disconnector devices mounted on pole-mounted equipment of a power grid, and an exemplary stationary connection status monitoring device, according to an embodiment.
Figure 3:
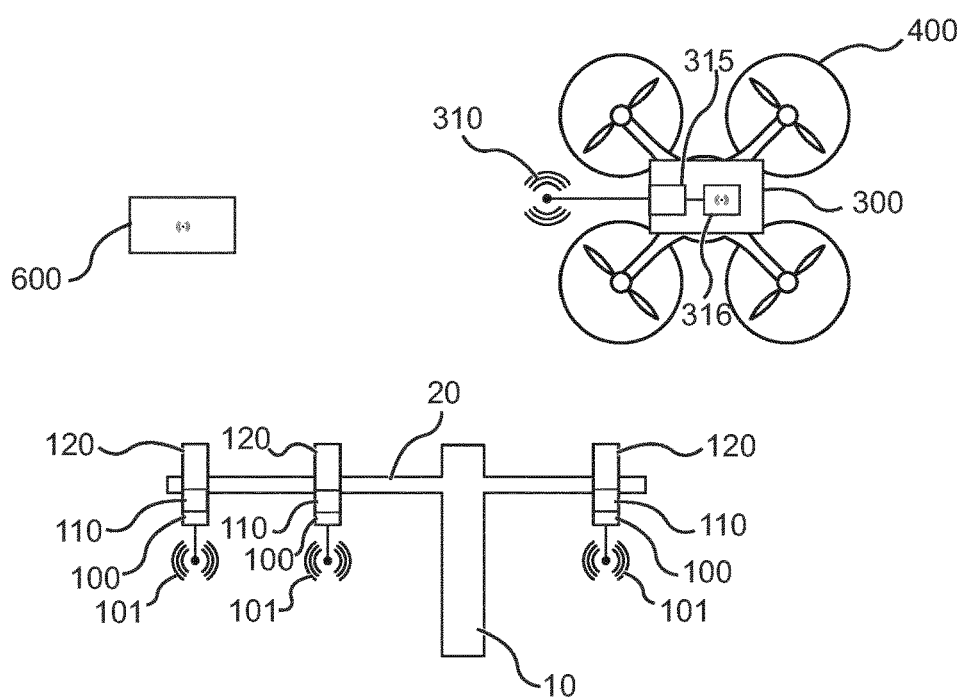
FIG. 3 schematically shows an exemplary configuration of plural disconnector devices mounted on pole-mounted equipment of a power grid, and an exemplary nonstationary connection status monitoring device, according to an embodiment.

In embodiments, such as those shown in FIGS. 2-3, a connection status monitoring device 300 is provided. The connection status monitoring device 300 is configured for monitoring an electrical connection status of the disconnector device 110 that is configured according to any of the embodiments described herein. The connection status monitoring device 300 comprises a determining section 315. The determining section 315 is configured to perform a contactless detection of the passive radio device 100. The determining section 315 is further configured to determine from the detected radio indicator signal whether the disconnector device is in one of the activated state and deactivated state. The determining section 315 is further configured to generate connection status indicator data. The connection status indicator data is indicative of the result of determination.

In this embodiment, in particular, the determining section 315 is configured to determine from the detected radio indicator signal whether the disconnector device is in either the activated state or the deactivated state.

Determining from the detected radio indicator signal may include that the technology is designed or configured such that the radio indicator signal is absent in one of the activated state and the deactivated state. For example, the configuration may be such that in either the activated state or in the deactivated state, the passive radio device 100 cannot be enabled via the incoming radio signal. Then, depending on the configuration, the determining section may determine, in the case that the radio indicator signal is present, that the disconnector device 110 is in the deactivated state, and in the case that the radio indicator signal is not present, that the disconnector device 110 is in the activated state. Of course, the configuration may as well be such that the determining section may determine, in the case that the radio indicator signal is not present, that the disconnector device 110 is in the deactivated state, and in the case that the radio indicator signal is present, that the disconnector device 110 is in the activated state.

The connection status monitoring device 300 may further comprise a wireless communication section 316. The wireless communication section 316 is adapted to connect to a wireless communication infrastructure 600 using a wireless protocol, and to transmit the connection status indicator data over the wireless communication infrastructure 600. The wireless communication infrastructure 600 is typically externally provided. Examples of the wireless communication infrastructure 600 include, without limitation, a wireless network like a public or private cellular network.

Further examples of the wireless communication infrastructure 600 include, without limitation, a low power long range data infrastructure, such as a LoRa base station coupled to the LoRaWAN network or other suitable low power long range data infrastructure. Yet further examples of the wireless communication infrastructure 600 include, without limitation, Bluetooth-based communication devices, WiFi-based communication devices, narrowband IoT-communication devices, Sigfox-based communication devices, LTE-based communication devices, 5G-based communication devices etc. For transmitting data via the wireless communication section 316, a used transmission energy for the data may be preferably in the range of at least 1 µWh and/or at most 1 mWh per transmission.

In embodiments, e.g. as shown in FIG. 2, the connection status monitoring device 300 may be stationary. Preferably, the stationary connection status monitoring device 300 is mounted in the vicinity of a disconnector device 110 to be monitored, i.e. within a communication range of the respective passive radio device 100. The communication range may e.g. be within a maximum of 30 meters, typically within a maximum of 15 meters or of 10 meters, more typically within a maximum of 5 meters. In the example of FIG. 2, each line L1, L2, L3 of the phases of the grid 200 has respective pole-mounted equipment 120. Each pole-mounted equipment 120 of lines L1, L2, L3 has a respective disconnector device 110 of lines L1, L2, L3 connected thereto. Each disconnector device 110 of lines L1, L2, L3 has a dedicated passive radio device 100 of lines L1, L2, L3. The stationary connection status monitoring device 300 is configured to perform the contactless detection of the respective indicator radio signal of each passive radio device 100 of lines L1, L2, L3, to determine for each respective indicator radio signal whether the corresponding disconnector device 120 of lines L1, L2, L3 is in one of the activated state and deactivated state (to determine for each respective indicator radio signal whether the corresponding disconnector device 120 of lines L1, L2, L3 is in either the activated state or the deactivated state), and to generate connection status indicator data for each of lines L1, L2, L3 indicative of the respective result of determination.

In embodiments, e.g. as shown in FIG. 3, the connection status monitoring device 300 is nonstationary. In particular, the connection status monitoring device 300 may be mounted on a vehicle, such as a ground vehicle or an aerial vehicle (an airborne vehicle). In FIG. 3, as an example of a nonstationary configuration of the connection status monitoring device 300, an aerial vehicle 400 comprises the connection status monitoring device 300. In particular, the connection status monitoring device 300 may be mounted on the aerial vehicle 400. The aerial vehicle 400 may be an autonomous vehicle, particularly an unmanned multirotor helicopter, for example a quadcopter. The aerial vehicle 400 may be configured such as to move to a predetermined or determinable location, or to move to multiple predetermined or determinable locations in succession. Preferably, the aerial vehicle 400 is configured to move to one or more of these locations in an autonomous manner Typically, one or more of the locations that the aerial vehicle 400 is configured to move to is within a communication range of a passive radio device 100 or within a communication range of multiple passive radio devices 100.

In the example of FIG. 3, each line L1, L2, L3 of the phases of the grid 200 has respective pole-mounted equipment 120. Each pole-mounted equipment 120 of lines L1, L2, L3 has a respective disconnector device 110 of lines L1, L2, L3 connected thereto. Each disconnector device 110 of lines L1, L2, L3 has a dedicated passive radio device 100 of lines L1, L2, L3. The aerial vehicle 400 may be configured to move to the respective communication range of each of the passive radio devices 100 of lines L1, L2, L3, typically in succession.

In another example, multiple pieces of pole-mounted equipment 120 each having a corresponding disconnector device 110 and a corresponding passive radio device 100 are mounted on multiple poles 10. The aerial vehicle 400 may be configured to move, e. g. from pole to pole, to the respective communication range of each of the passive radio devices 100 of corresponding to the poles 10, typically in succession.

In embodiments, an assembly comprising the disconnector device 110 and the connection status monitoring device 300 is used in the power distribution or transmission grid 200 for monitoring the connection status of the disconnector device.

In embodiments, a grid protection system comprises pole-mounted equipment 120 that is connected to the power distribution or transmission grid 200. The grid protection system further comprises the disconnector device 110. The disconnector device 110 is connected to the pole-mounted equipment 120. The grid protection system further comprises the connection status monitoring device 300. According to this embodiment, the configuration may be such that the pole-mounted equipment 120 is electrically connected through the disconnector device between a line L1, L2, L3 of the power distribution or transmission grid 200 and ground 210.

Figure 4A:
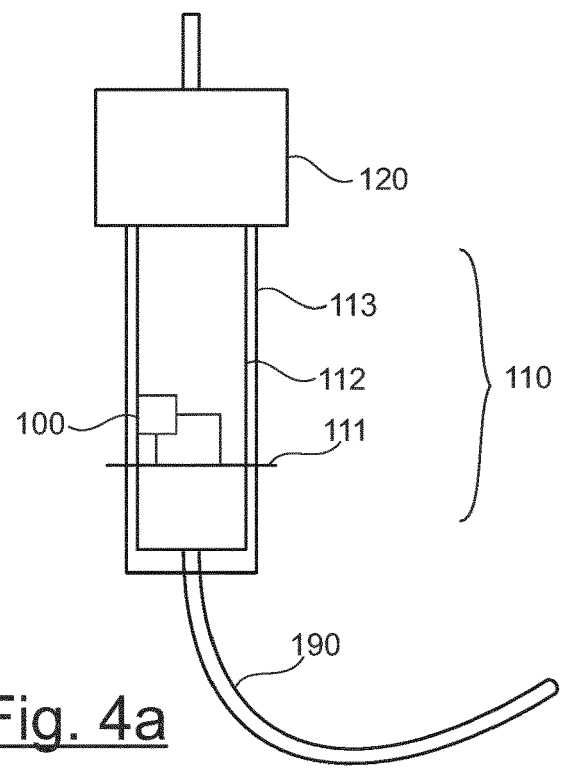
FIGS. 4a and 4b schematically show an exemplary configuration of a pole-mounted equipment and disconnector device according to an embodiment.
Figure 4B:
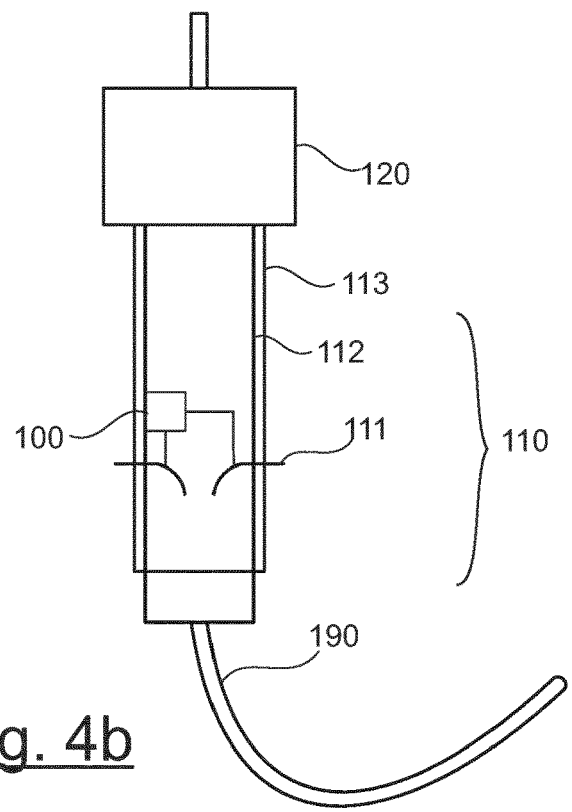

FIGS. 4a and 4b schematically show an exemplary configuration of pole-mounted equipment 120 and a disconnector device 110 according to an embodiment. In FIG. 4a, the disconnector device is shown in a deactivated state. The pole-mounted equipment, in FIGS. 4a and 4b a surge arrester 120, is connected, via the disconnector device 110, to the ground cable 190. The ground cable 190, in turn, is connected to ground 210, as shown e.g. in FIG. 1. When the surge arrester 120 becomes conductive in case of an overvoltage condition, the energy is dissipated via the disconnector device 110 and the ground cable 190 to ground 210. In FIG. 4b, the disconnector device 110 is shown in an activated state, wherein the connection from the surge arrester 120 to the ground cable 190 and ground 210 is interrupted. FIG. 4b thus shows the activated, or triggered, state of the disconnector device 110.

In FIGS. 4a and 4b, the disconnector device has an outer part 113 and an inner part 112. In the example shown in the drawings, the outer part 113 and the inner part 112 are made of a plastic material, but there is no limitation in terms of the material used. The outer part 113 is fixed, or stationary, while the inner part 112 is configured such as to move in the axial direction. A fully inserted position of the inner part 112 with respect to the outer part 113 is shown in FIG. 4a, while a partially moved out position of the inner part 112 with respect to the outer part 113 is shown in FIG. 4b.

In the embodiment shown in FIGS. 4a and 4b, as an example, the outer part 113 is a fixed or stationary part and the inner part 112 is a moving part. An activation interactor 111 is mechanically fixed to at least one of the fixed part 113 and the moving part 112. A property of the activation interactor 111 is changed depending on the activation state of the disconnector device 110. The passive radio device 100 is configured to change the indicator radio signal by sensing the property of the activation interactor 111. The property may be, for example, an impedance that depends on the state of the disconnector device 110.

In the example shown in FIGS. 4a and 4b, the activation interactor 111 is a thin wire that is mechanically fixed on the fixed part 113 and the moving part 112. For example, the thin wire 111 goes through a pinhole on the fixed part 113. When the moving part 112 is moved in the axial direction, i.e. at least partially out of the fixed part 113, as shown in FIG. 4b, the thin wire 111 breaks. The thin wire 111 is electrically connected to the passive radio device 100. The passive radio device 100 is configured to detect the property of the activation interactor 111. In an example, the passive radio device 100 is configured to detect a change of impedance in the thin wire 111. In the actual example of FIGS. 4a and 4b, the passive radio device 100 is configured to detect a resistance value of the thin wire 111, the resistance value representing substantially a short-circuit state (FIG. 4a) and an interrupted state (FIG. 4b). Alternatively, the thin wire 111 may as well be connected to an intermediary device (not shown) that is configured to supply an information on the property to the passive radio device 100.

Figure 5A:
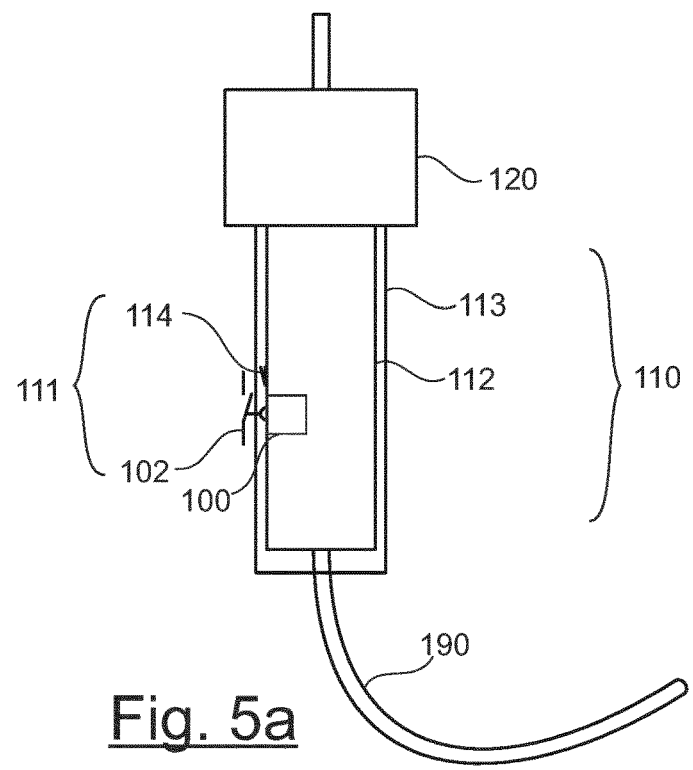
FIGS. 5a and 5b schematically show another exemplary configuration of a pole-mounted equipment and disconnector device according to an embodiment.
Figure 5B:
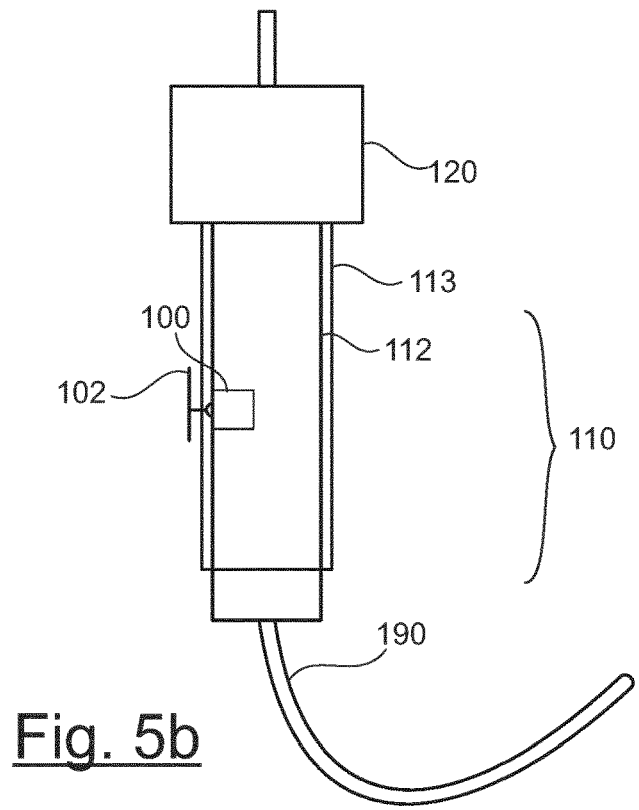

FIGS. 5a and 5b schematically show an exemplary configuration of pole-mounted equipment 120 and a disconnector device 110 according to another embodiment. The concept shown in FIGS. 5a and 5b is another variant that shown in FIGS. 4a and 4b. In FIG. 5a, the disconnector device is shown in a deactivated state. The pole-mounted equipment, in FIGS. 5a and 5b a surge arrester 120, is connected, via the disconnector device 110, to the ground cable 190. The ground cable 190, in turn, is connected to ground 210, as shown e.g. in FIG. 1. When the surge arrester 120 becomes conductive in case of an overvoltage condition, the energy is dissipated via the disconnector device 110 and the ground cable 190 to ground 210. In FIG. 5b, the disconnector device 110 is shown in an activated state, wherein the connection from the surge arrester 120 to the ground cable 190 and ground 210 is interrupted. FIG. 5b thus shows the activated, or triggered, state of the disconnector device 110.

In the example of FIGS. 5a and 5b, the disconnector device has an outer part 113 and an inner part 112. As an example, the outer part 113 is a fixed or stationary part and the inner part 112 is a moving part. In the example shown in the drawings, the fixed part 113 and the moving part 112 are made of a plastic material, but there is no limitation in terms of the material used. The fixed part 113 is stationary, while the moving part 112 is configured such as to move in the axial direction. A fully inserted position of the moving part 112 with respect to the fixed part 113 is shown in FIG. 5a, while a partially moved out position of the moving part 112 with respect to the fixed part 113 is shown in FIG. 5b.

In the embodiment shown in FIGS. 5a and 5b, an activation interactor 111 comprises a switch 102, for example a pressure switch. The switch 102 is arranged on the fixed part 113. A bulge 114 is mechanically fixed on the inner part 112. A property of the activation interactor 111 is changed depending on the activation state of the disconnector device 110. The switch 102 is pressed by the bulge 114 arranged on the moving part 112. The passive radio device 100 is configured to change the indicator radio signal by sensing the property of the activation interactor 111. In the example of FIGS. 5a and 5b, the property corresponds to an open position or closed position of the switch 102. When the moving part 112 moves with respect to the fixed part 113, the bulge 114 interacts with the switch 102 to alter the position of the switch 102. In FIG. 5a, the switch 102 is in the open position, while in FIG. 5b, the switch 102 is in the closed position. In another arrangement (not shown), the switch 102 positions may differ.

The passive radio device 100 is configured to detect the property of the activation interactor 111. In the actual example of FIGS. 5a and 5b, the passive radio device 100 is configured to detect the switch 102 position.

Figure 6A:
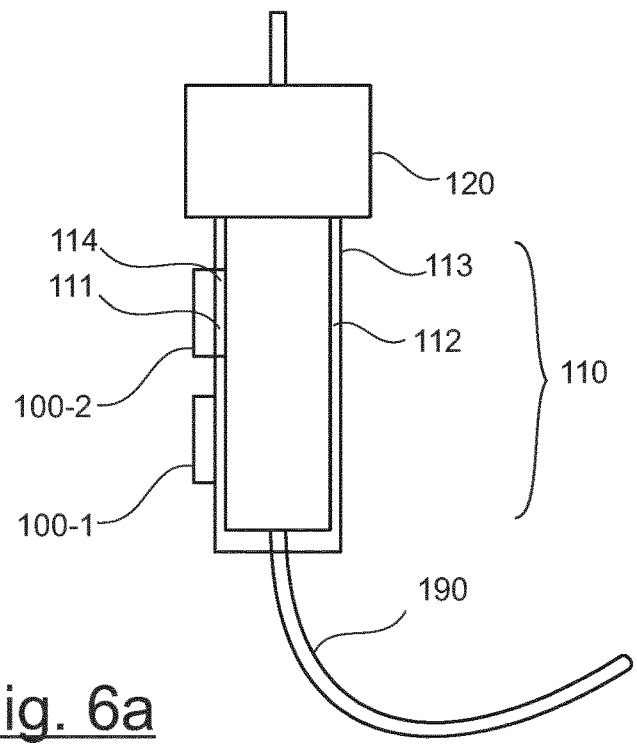
FIGS. 6a and 6b schematically show another exemplary configuration of a pole-mounted equipment and disconnector device according to an embodiment.
Figure 6B:
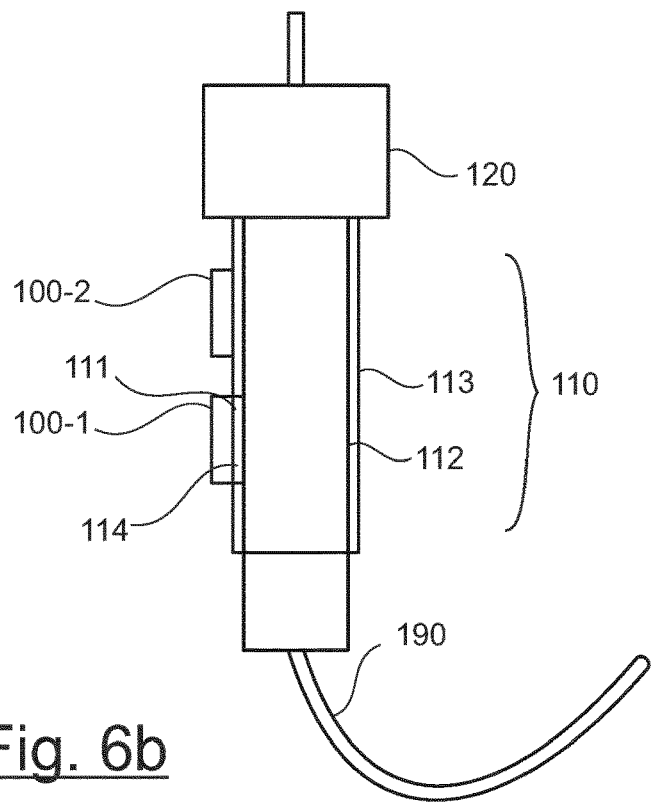

FIGS. 6a and 6b schematically show an exemplary configuration of pole-mounted equipment 120 and a disconnector device 110 according to another embodiment. In FIG. 6a, the disconnector device is shown in a deactivated state. The pole-mounted equipment, in FIGS. 6a and 6b a surge arrester 120, is connected, via the disconnector device 110, to the ground cable 190. The ground cable 190, in turn, is connected to ground 210, as shown e. g. in FIG. 1. When the surge arrester 120 becomes conductive in case of an overvoltage condition, the energy is dissipated via the disconnector device 110 and the ground cable 190 to ground 210. In FIG. 6b, the disconnector device 110 is shown in an activated state, wherein the connection from the surge arrester 120 to the ground cable 190 and ground 210 is interrupted. FIG. 6b thus shows the activated, or triggered, state of the disconnector device 110.

In the example of FIGS. 6a and 6b, the disconnector device has an outer part 113 and an inner part 112. As an example, the outer part 113 is a fixed or stationary part and the inner part 112 is a moving part. In the example shown in the drawings, the fixed part 113 and the moving part 112 are made of a plastic material, but there is no limitation in terms of the material used. The fixed part 113 is stationary, while the moving part 112 is configured such as to move in the axial direction. A fully inserted position of the moving part 112 with respect to the fixed part 113 is shown in FIG. 6a, while a partially moved out position of the moving part 112 with respect to the fixed part 113 is shown in FIG. 6b.

In the embodiment shown in FIGS. 6a and 6b, a first passive radio device 100-1 is arranged and fixed on the fixed part 113. A second passive radio device 100-2 is arranged at an axial distance from the first passive radio device 100-1 on the fixed part 113. The number of passive radio devices 100-1, 100-2 is merely an example and not limited to two. In particular, some or all of the features and effects described in connection with the embodiment shown in FIGS. 6a and 6b are applicable to a single passive radio device. Likewise, some or all of the features and effects described in connection with the embodiment shown in FIGS. 6a and 6b are applicable to an arrangement including more than two passive radio devices. For the sake of simplicity, it is assumed that each of the passive radio devices 100-1, 100-2 corresponds to a representation of a passive radio device 100 as described herein; reference is made to one of "passive radio device 100-1" or "passive radio device 100-2" if the particular representation is relevant, and to "passive radio device 100" when referring generally to any representation thereof.

An activation interactor 111 is fixed on the moving part 112 such that it moves along with a movement of the moving part 112 relative to the fixed part 113. The activation interactor 111 is configured to change the indicator radio signal of the passive radio device depending on the state.

Changing the indicator radio signal may include changing a frequency characteristic of the passive radio device 100 or elements thereof. For example, changing the indicator radio signal may include that the passive radio device 100 whose frequency characteristic is changed can be enabled or cannot be enabled by the incoming radio signal, e.g. depending on a direction of the change. In particular, changing the indicator radio signal may include that the passive radio device 100 whose frequency characteristic is changed cannot be enabled, activated and/or detected by a connection status monitoring device 300 such that the connection status monitoring device 300 cannot find the respective passive radio device 100. Altering or changing the indicator radio signal may also include permanently destroying an antenna element of the respective passive radio device 100.

In embodiments, such as in FIGS. 6a and 6b, the activation interactor 111 comprises a radiofrequency-altering material 114. The radiofrequency-altering material 114 has a property such that, when located in the vicinity of a passive radio device such as the first passive radio device 100-1 or the second passive radio device 100-2, a radio frequency characteristic of the respective passive radio device 100-1, 100-2 is altered, or changed. Altering or changing the radio frequency characteristic may include temporarily detuning an antenna element of the passive radio device 100-1, 100-2. A vicinity may include a distance of less than 10 cm, typically less than 5 cm, in particular less than 2 cm.

The radiofrequency-altering material 114 typically comprises a sufficient amount or consists of one a metal material, a ferrite material, or any material having a relative permeability of 50 or more and/or having a relative permittivity of 5 or more.

In embodiments, changing the frequency characteristic may include raising or lowering a resonance frequency of the respective passive radio device 100-1, 100-2 relative to an initial resonance frequency thereof.

In embodiments, such as in FIGS. 6a and 6b, the disconnector device 110 is configured to effect a relative movement between the activation interactor 111 and the passive radio device 100-1, 100-2 upon activation of the disconnector device 110. Thereby, the frequency characteristic of the respective passive radio device 100-1, 100-2 is changed. Changing the frequency characteristic may include, for example, detuning the respective passive radio device 100-1, 100-2. Detuning may result in a connection status monitoring device 300 not finding the detuned passive radio device 100-1, 100-2, i. e. configuration may be such that the connection status monitoring device cannot enable the detuned passive radio device 100-1, 100-2. For example, the antenna of the respective passive radio device 100-1, 100-2 becomes detuned, which renders the passive radio device 100-1, 100-2 unreachable via radio at about its rated frequency. This way of operation is applicable to an arbitrary number of passive radio devices 100-1, 100-2, including only one passive radio device 100-1, 100-2, or two or more passive radio devices 100-1, 100-2.

In embodiments, such as in FIGS. 6a and 6b and as mentioned above, the disconnector device 110 comprises the first passive radio device 100-1 and the second passive radio device 100-2. In other words, the disconnector device 110 comprises two or more passive radio devices 100-1, 100-2. In this configuration, each of the first passive radio device 100-1 and the second passive radio device 100-2 is adapted to have its respective frequency characteristic changed by the relative movement between the activation interactor 111 and the passive radio device 100-1, 100-2 upon activation of the disconnector device 110. In this configuration according to the embodiment, for the same relative movement (i. e., for said relative movement), the change of frequency characteristic of the first passive radio device 100-1 is different from the change of frequency characteristic of the second passive radio device 100-2.

In this dual passive radio device variant, the radiofrequency-altering material 114 is close to the second passive radio device 100-2 (in the vicinity of the second passive radio device 100-2) and far from the first passive radio device 100-1 (out of the vicinity of the first passive radio device 100-1) when the disconnector device 110 has not been activated and the surge arrester 120 is connected to ground 210. In this state, the second passive radio device 100-2 is detuned, whereas the first passive radio device 100-1 is not detuned. A connection status monitoring device 300 can enable/detect the first passive radio device 100-1, but not the second passive radio device 100-2. When the disconnector device 110 is activated, the radiofrequency-altering material 114 is moved closer to first passive radio device 100-1 (into the vicinity of the first passive radio device 100-1) and drawn away from the second passive radio device 100-2 (out of the vicinity of the second passive radio device 100-2). In this state, the first passive radio device 100-1 is detuned, whereas the second passive radio device 100-2 is not detuned. A connection status monitoring device 300 can enable/detect the second passive radio device 100-2, but not the first passive radio device 100-1. In other words, a connection status monitoring device 300 can enable the respective one of the passive radio devices 100-1, 100-2 that is not detuned according to the present state.

For example, in the dual passive radio device variant, configuration is such that in the state in which the disconnector device 110 is not activated and the radiofrequency-altering material 114 is in the vicinity of the second passive radio device 100-2, the resonance frequency of the second passive radio device 100-2 is lowered relative to its initial (rated) resonance frequency.

When the disconnector device 110 is activated, the radiofrequency-altering material 114 is moved into the vicinity of the first passive radio device 100-1. The resonance frequency of the second passive radio device 100-2 is raised, whereas the resonance frequency of the first passive radio device 100-1 is lowered. Hence, the change of the frequency characteristic of the first passive radio device 100-1 is different from the change of the frequency characteristic of the second passive radio device 100-2. Also, the frequency characteristic of the first passive radio device 100-1 is shifted to be further from the resonance frequency than the frequency characteristic of the second passive radio device 100-2, and the frequency characteristic of the second passive radio device 100-2 is shifted to be nearer to the resonance frequency than the frequency characteristic of the first passive radio device 100-1.

When the disconnector device 110 is deactivated, the radiofrequency-altering material 114 is moved into the vicinity of the second passive radio device 100-2. The resonance frequency of the first passive radio device 100-1 is raised, whereas the resonance frequency of the second passive radio device 100-2 is lowered. Hence, the change of the frequency characteristic of the first passive radio device 100-1 is different from the change of the frequency characteristic of the second passive radio device 100-2. Also, the frequency characteristic of the first passive radio device 100-1 is shifted to be nearer to the resonance frequency than the frequency characteristic of the second passive radio device 100-2, and the frequency characteristic of the second passive radio device 100-2 is shifted to be further from the resonance frequency than the frequency characteristic of the first passive radio device 100-1.

It is to be noted that the resonance frequencies of the first passive radio device 100-1 and the second passive radio device 100-2 are preferably substantially the same. However, there is no limitation on the resonance frequencies being the same, and the configuration may be such that they differ from each other.

In embodiments, the passive radio device 100 comprises an RFID element. Typically, the RFID element has an identifier. Particularly, when multiple passive radio devices 100-1, 100-2 are involved, be it on the same pole-mounted equipment or on different pieces of pole-mounted equipment, the RFID elements each have an identifier different from one another. An identifier may for example serve to uniquely identify the respective element. Typically, an element-unique identifier is part of the indicator radio signal. Uniqueness, in this context, includes pseudo-uniqueness as long as a distinction between detecting each of the passive radio devices 100-1, 100-2 involved can be ensured. For example, the passive radio device 100-1, upon being enabled, may transmit a first indicator radio signal having an identifier A. The passive radio device 100-2, upon being enabled, may transmit a second indicator radio signal having an identifier B.

When a connection status monitoring device 300 detects the first indicator signal having the identifier A, this means that the first passive radio device 100-1 can be enabled (e.g. in a case in which the radiofrequency-altering material 114 is not in the vicinity of the first passive radio device 100-1). The connection status monitoring device 300 determines that the disconnector device 110 is in the deactivated state.

When a connection status monitoring device 300 detects the second indicator signal having the identifier B, this means that the second passive radio device 100-2 can be enabled (e.g. in a case in which the radiofrequency-altering material 114 is not in the vicinity of the second passive radio device 100-2). The connection status monitoring device 300 determines that the disconnector device 110 is in the activated state.

When from the circumstances it is clear that a connection status monitoring device 300 is located within a transmission range of the passive radio devices 100-1, 100-2 and none of the first passive radio device 100-1 and the second passive radio device 100-2 can be enabled, the connection status monitoring device 300 may determine that a malfunction has occurred, such as an interference condition, an out-of-order condition or the like.

It is noted that various aspects, features and embodiments have been described herein. It will be apparent to those skilled in the art that the aspects, features or embodiments may be combined as appropriate, or that some of the aspects, features or embodiments may be omitted as appropriate without departing from the concepts disclosed herein.

The invention claimed is:

1. A disconnector device being connectable to pole-mounted equipment in a power distribution or transmission grid, and being configured to be activated in case of an overload condition, thereby disconnecting the pole-mounted equipment,
the disconnector device comprising:
at least one passive radio device to be enabled via an incoming radio signal, wherein the passive radio device, upon being enabled, is configured to transmit, in at least one state of the disconnector device, an indicator radio signal indicative of the respective state of the disconnector device, the state being one of an activated state and a deactivated state of the disconnector device; and
an activation interactor configured to change the indicator radio signal of the passive radio device depending on the state, the changing the indicator radio signal including changing a frequency characteristic of the passive radio device.

2. The disconnector device according to claim 1, wherein the activation interactor comprises a radiofrequency-altering material.

3. The disconnector device according to claim 1, wherein the disconnector device is configured to effect, upon an activation of the disconnector device, a relative movement between the activation interactor and the passive radio device, thus changing the frequency characteristic of the passive radio device.

4. The disconnector device according to claim 3, wherein changing the frequency characteristic comprises raising or lowering a resonance frequency of the passive radio device relative to an initial resonance frequency thereof.

5. The disconnector device according to claim 3, comprising a first passive radio device and a second passive radio device, the first and second passive radio devices each adapted to have their respective frequency characteristic changed by the relative movement, wherein for the same relative movement, the change of frequency characteristic of the first passive radio device is different from the change of frequency characteristic of the second passive radio device.

6. The disconnector device according to claim 5, wherein for the same relative movement and a predetermined rated resonance frequency, the frequency characteristic of the first passive radio device is shifted to be nearer to the resonance frequency than the frequency characteristic of the second passive radio device, and the frequency characteristic of the second passive radio device is shifted to be further from the resonance frequency than the frequency characteristic of the first passive radio device.

7. The disconnector device according to claim 1, wherein the passive radio device is configured to change the indicator radio signal by sensing a property of the activation interactor.

8. The disconnector device according to claim 7, wherein the activation interactor comprises a conductor configured and arranged such as to have an impedance that depends on the state.

9. The disconnector device according to claim 1, wherein the passive radio device comprises an RFID element.

10. The disconnector device according to claim 1, wherein the passive radio devices each comprise an RFID element, the RFID elements each having an identifier different from one another.

11. A connection status monitoring device for monitoring an electrical connection status of a disconnector device according to claim 1, the connection status monitoring device comprising:
a determining section configured:
to perform a contactless detection of the indicator radio signal of the passive radio device,
to determine from the detected indicator radio signal whether the disconnector device is in one of the activated state and deactivated state, and
to generate connection status indicator data indicative of the result of determination.

12. The connection status monitoring device according to claim 11, further comprising a wireless communication section adapted to connect to a wireless communication infrastructure using a wireless communication protocol, and to transmit the connection status indicator data over the wireless communication infrastructure.

13. Use of an assembly in a power distribution or transmission grid, the assembly comprising the disconnector device according to claim 1, the disconnector device being connectable to pole-mounted equipment in the power distribution or transmission grid, and the assembly comprising a connection status monitoring device comprising a determining section configured:
to perform a contactless detection of the indicator radio signal of the passive radio device,
to determine from the detected indicator radio signal whether the disconnector device is in one of the activated state and deactivated state, and
to generate connection status indicator data indicative of the result of determination.

14. A grid protection system, comprising:
pole-mounted equipment connected to a power distribution or transmission grid;
the disconnector device according to claim 1 connected to the pole-mounted equipment; and
a connection status monitoring device comprising a determining section configured:
to perform a contactless detection of the indicator radio signal of the passive radio device,
to determine from the detected indicator radio signal whether the disconnector device is in one of the activated state and deactivated state, and
to generate connection status indicator data indicative of the result of determination.

15. The grid protection system according to claim 14, wherein the pole-mounted equipment is electrically connected, through the disconnector device, between a line of the power distribution or transmission grid and ground.

16. An autonomous aerial vehicle comprising the connection status monitoring device according to claim 11.

17. A method for indicating a state of a disconnector device, the disconnector device being connectable to pole-mounted equipment in a power distribution or transmission grid, and the disconnector device being configured to be activated in case of an overload condition, thereby disconnecting the pole-mounted equipment, wherein the disconnector device comprises at least one passive radio device to be enabled via an incoming radio signal, and the state being one of an activated state and a deactivated state of the disconnector device, the method comprising:
enabling the passive radio device;
when the disconnector device is in at least one of the states, transmitting, via the passive radio device, an indicator signal indicative of the respective state of the disconnector device; and effecting, upon an activation of the disconnector device, a relative movement between an activation interactor and the passive radio device, thus changing the frequency characteristic of the passive radio device.

\* \* \* \* \*